(12) United States Patent
Ding et al.

(10) Patent No.: US 8,867,488 B2
(45) Date of Patent: Oct. 21, 2014

(54) METHOD, SYSTEM AND DEVICE FOR NETWORK HANDOVER

(75) Inventors: Zhiming Ding, Shenzhen (CN); Yongli Yang, Shenzhen (CN); Guiming Shu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 65 days.

(21) Appl. No.: 13/427,164

(22) Filed: Mar. 22, 2012

(65) Prior Publication Data

US 2012/0182970 A1    Jul. 19, 2012

Related U.S. Application Data

(63) Continuation of application No. PCT/CN2010/076773, filed on Sep. 9, 2010.

(30) Foreign Application Priority Data

Sep. 22, 2009 (CN) .......................... 2009 1 0173951

(51) Int. Cl.
*H04W 4/00* (2009.01)

(52) U.S. Cl.
USPC ........................ 370/331; 370/277; 370/349

(58) Field of Classification Search
USPC .......... 370/331, 332, 277, 349; 455/410, 436
See application file for complete search history.

(56) References Cited

U.S. PATENT DOCUMENTS

| | | | |
|---|---|---|---|
| 7,302,264 B2 * | 11/2007 | Yoon et al. | 455/436 |
| 7,418,264 B2 * | 8/2008 | Kim | 455/436 |
| 7,440,757 B2 * | 10/2008 | Kwon et al. | 455/436 |
| 8,094,621 B2 * | 1/2012 | Guo et al. | 370/331 |
| 8,184,594 B2 * | 5/2012 | Li et al. | 370/331 |
| 8,385,549 B2 * | 2/2013 | Wang et al. | 380/270 |
| 8,412,200 B2 * | 4/2013 | Son et al. | 455/436 |

(Continued)

FOREIGN PATENT DOCUMENTS

| | | |
|---|---|---|
| CN | 101083610 A | 12/2007 |
| CN | 101472305 A | 7/2009 |
| WO | WO 2007138056 A1 | 12/2007 |

OTHER PUBLICATIONS

Written Opinion of the International Searching Authority issued in corresponding PCT Patent Application No. PCT/CN2010/076773, mailed Dec. 23, 2010.

(Continued)

*Primary Examiner* — Ricky Ngo
*Assistant Examiner* — Dewanda Samuel
(74) *Attorney, Agent, or Firm* — Brinks Gilson & Lione

(57) ABSTRACT

A method, a system and a device for network handover are provided, which are applied to the field of communications technologies. The method includes the following steps that: a terminal first obtains information of a handover manner of handover from a virtual base station to a target base station, and then sends a corresponding message to the virtual base station according to the information of the handover manner, so as to perform network handover, so that in a procedure that the terminal is handed over from a non-WiMAX network to a WiMAX network, the terminal may be directly handed over according to the handover manner supported by the virtual base station. Compared with the conventional art in which handover manners require handover attempts, the adoption of the method for network handover reduces handover time and increases network handover efficiency.

12 Claims, 4 Drawing Sheets

(56) References Cited

U.S. PATENT DOCUMENTS

| | | |
|---|---|---|
| 2009/0186616 A1* | 7/2009 | Kim et al. .................. 370/331 |
| 2010/0113024 A1* | 5/2010 | Wu .............................. 455/436 |
| 2010/0322118 A1 | 12/2010 | Fang et al. |
| 2011/0019641 A1* | 1/2011 | Chang et al. ............... 370/331 |
| 2012/0140733 A1* | 6/2012 | Jung et al. .................. 370/331 |

OTHER PUBLICATIONS

International Search Report issued in corresponding PCT Patent Application No. PCT/CN2010/076773, mailed Dec. 23, 2010.

Gupta, Ed., "WiFi and WiMAX Interworking" Version 0.03, WiMax Forum Network Working Group, 2009.

Office Action issued in corresponding Chinese Patent Application No. 200910173951.8, mailed Mar. 26, 2013.

Office Action issued in corresponding Chinese Patent Application No. 200910173951.8, mailed Jul. 18, 2012.

Motorola et al., "Optimization Procedure for WiMAX Access Discovery" Agenda Item 8.4.3, 3GPP TSG SA WG2 Architecture—S2#59. Helsinki, Finland, Aug. 27-31, 2007. S2-073670.

Samsung, "Text Proposal for Handover to(from) WiMAX" Agenda Item 6, 3GPP TSG-RAN WG2#59bis. Shanghai, China, Oct. 8-12, 2007.

* cited by examiner

METHOD, SYSTEM AND DEVICE FOR NETWORK HANDOVER

CROSS-REFERENCE TO RELATED APPLICATIONS

This application is a continuation of International Application No. PCT/CN2010/076773, filed on Sep. 9, 2010, which claims priority to Chinese Patent Application No. 200910173951.8, filed on Sep. 22, 2009, both of which are hereby incorporated by reference in their entireties.

FIELD OF THE INVENTION

The present invention relates to the field of communications technologies, and in particular, to a method, a system and a device for network handover.

BACKGROUND OF THE INVENTION

Referring to FIG. 1, in the field of communications technologies nowadays, during handover from a non-worldwide interoperability for microwave access broadband wireless access technology (Worldwide Interoperability for Microwave Access, WiMAX) network to a WiMAX network, a terminal uses a single-radio-frequency handover manner. The terminal first performs ranging, base station capability negotiation, pre-authentication and interaction between attached networks with a virtual WiMAX base station through a tunnel in the current non-WiMAX network, thereby entering the WiMAX network. Next, an initiate handover manner or idle mode handover manner is adopted, so the terminal is handed over from the virtual base station to a target base station or enters an idle mode of the WiMAX network. After the terminal is handed over to the radio frequency of the WIMAX network, WiMAX network re-entry is performed from the target base station on an air interface of the terminal, so as to complete a network handover procedure.

In the initiate handover manner, a terminal initiatively sends a handover request message to a virtual base station, where the handover request message includes information of one or more candidate target base stations discovered by the terminal. After receiving the handover request message, the virtual base station interacts with each candidate target base station, so as to enable each candidate target base station to perform handover preparation for the terminal. After receiving a handover response message from the virtual base station, the terminal sends a handover indication message to the virtual base station, so as to specify a finally determined handover target base station. After the terminal is handed over from a non-WiMAX radio frequency to a WiMAX radio frequency on an air interface, the terminal and the determined target base station perform the operations such as ranging to complete WiMAX network re-entry, so as to finally complete a handover procedure. After performing the radio frequency handover in such a handover manner, the terminal and the target base station perform a step of network re-entry, which usually includes ranging and capability negotiation, and the complete authentication is no longer required.

In the idle mode handover manner, a terminal sends a request message to a virtual base station, and requests to enter an idle mode. The virtual base station returns a response message for confirming to enter the idle mode, instructs a network to perform proper processing, records the terminal as being in the idle mode, and the terminal is temporarily not handed over to a target base station. In the idle mode, the network releases resources relevant to the terminal as much as possible, and only reserves indispensable information, such as authentication information, and information about an attached base station. After the terminal is handed over, on an air interface, to a WiMAX radio frequency, the terminal may indicate exit of the idle mode in a ranging request during network re-entry with the target base station selected by the terminal. Subsequently, the network performs the processing of exiting the idle mode on the terminal, and the complete authentication is no longer required. In this procedure, the terminal does not perform a base station handover action, but the terminal enters the idle mode from the virtual base station, and subsequently exits the idle mode from the target base station, so as to actually achieve the objective of handover from the virtual base station to the target base station.

During the practice and research of the conventional art above, inventors of the present invention find that:

When a terminal is handed over from a non-WiMAX network to WiMAX, initiate handover or idle mode handover is adopted, but which method is adopted to perform handover is deployed on a virtual base station and decided by the virtual base station. The terminal attempts to perform handover in one manner first, and if the handover is rejected by the virtual base station, the handover is performed in another manner. In this way, the handover time is delayed and the efficiency is not high.

SUMMARY OF THE INVENTION

Embodiments of the present invention provide a method, a system and a device for network handover, which increase network handover efficiency, and reduce network handover time.

The embodiments of the present invention adopt the following technical solutions.

An embodiment of the present invention provides a method for network handover, which includes:

obtaining information of a handover manner of a terminal being handed over from a virtual base station to a target base station, in which the handover manner is supported by the virtual base station, and the information of the handover manner includes information indicating initiate handover and/or information indicating idle mode handover; and sending a corresponding message to the virtual base station according to the information of the handover manner, so that the terminal is handed over from the virtual base station to the target base station in the corresponding handover manner.

An embodiment of the present invention further provides a method for network handover, which includes:

adding, to a bearer message, information of a handover manner of a terminal being handed over from a virtual base station to a target base station, in which the handover manner is supported by the virtual base station; and sending the bearer message to the terminal, so that the terminal is handed over from the virtual base station to the target base station according to the information of the handover manner supported by the virtual base station.

An embodiment of the present invention further provides a terminal, which includes:

a manner information obtaining unit, configured to obtain information of a handover manner of a terminal being handed over from a virtual base station to a target base station, in which the handover manner is supported by the virtual base station, and the information of the handover manner includes information indicating initiate handover and/or information indicating idle mode handover; and a handover unit, configured to send a corresponding message to the virtual base station according to the information of the handover manner obtained by the manner information obtaining unit, so that the terminal is handed over from the virtual base station to the target base station in the corresponding handover manner.

An embodiment of the present invention further provides a virtual base station, which includes:

a first adding unit, configured to add, to a bearer message, information of a handover manner of a terminal being handed over from the virtual base station to a target base station, in which the handover manner is supported by the virtual base station; and a first sending handover unit, configured to send the bearer message to which the first adding unit has added the information of the handover manner to the terminal, so that the terminal is handed over from the virtual base station to the target base station according to the information of the handover manner supported by the virtual base station.

An embodiment of the present invention further provides an information server, which includes:

a second receiving processing unit, configured to receive a query request message sent by a terminal, in which the query request message includes position information of the terminal and/or identifier information of a target base station; and locate a corresponding virtual base station according to the position information of the terminal and/or the identifier information of the target base station included in the query request message;

a second adding unit, configured to add information of a handover manner of the terminal being handed over from the virtual base station to a target base station to a query response message, in which the handover manner is supported by the virtual base station located by the second receiving processing unit; and a second sending handover unit, configured to send the query response message to which the second adding unit has added the information of the handover manner to the terminal, so that the terminal is handed over from the virtual base station to the target base station according to the information of the handover manner supported by the virtual base station.

An embodiment of the present invention further provides a system for network handover, which includes: a terminal and a virtual base station, in which:

the virtual base station is configured to add information of a handover manner of the terminal being handed over from the virtual base station to a target base station to a bearer message, in which the handover manner is supported by the virtual base station; and to send the bearer message to the terminal; and the terminal is configured to receive the bearer message sent by the virtual base station, and obtain the information of the handover manner of the terminal being handed over from the virtual base station to the target base station, in which the handover manner is supported by the virtual base station, and the information of the handover manner includes information indicating initiate handover and/or information indicating idle mode handover; and send a corresponding message to the virtual base station according to the information of the handover manner, so that the terminal is handed over from the virtual base station to the target base station.

It can be seen that, the network handover manner adopted in the embodiments of the present invention is as follows: a terminal first obtains information of a handover manner of handover from a virtual base station to a target base station, and then sends a corresponding message to the virtual base station according to the information of the handover manner, so that the terminal is handed over from the virtual base station to the target base station; in this way, in a procedure that the terminal is handed over from a non-WiMAX network to a WiMAX network, the terminal may be directly handed over according to the handover manner supported by the virtual base station. Compared with the conventional art in which handover manners require handover attempts, the adoption of the method for network handover of the embodiment of the present invention reduces handover time and increases network handover efficiency.

BRIEF DESCRIPTION OF THE DRAWINGS

To illustrate the technical solutions according to the embodiments of the present invention or in the conventional art more clearly, the accompanying drawings required for describing the embodiments or the conventional art are introduced below briefly. Apparently, the accompanying drawings in the following descriptions merely show some of the embodiments of the present invention, and persons of ordinary skill in the art can obtain other drawings according to the accompanying drawings without creative efforts.

DETAILED DESCRIPTION OF THE EMBODIMENTS

The following describes a method, a device and a system for transmitting and receiving a multi-path media stream in multimedia communication of embodiments of the present invention are described in detail with reference to the accompanying drawings.

It should be noted that, the described embodiments are only a part of the embodiments of the present invention rather than all the embodiments. All other embodiments obtained by persons of ordinary skill in the art based on the embodiments of the present invention without creative efforts shall fall within the protection scope of the present invention.

Method Embodiment

Figure 1:
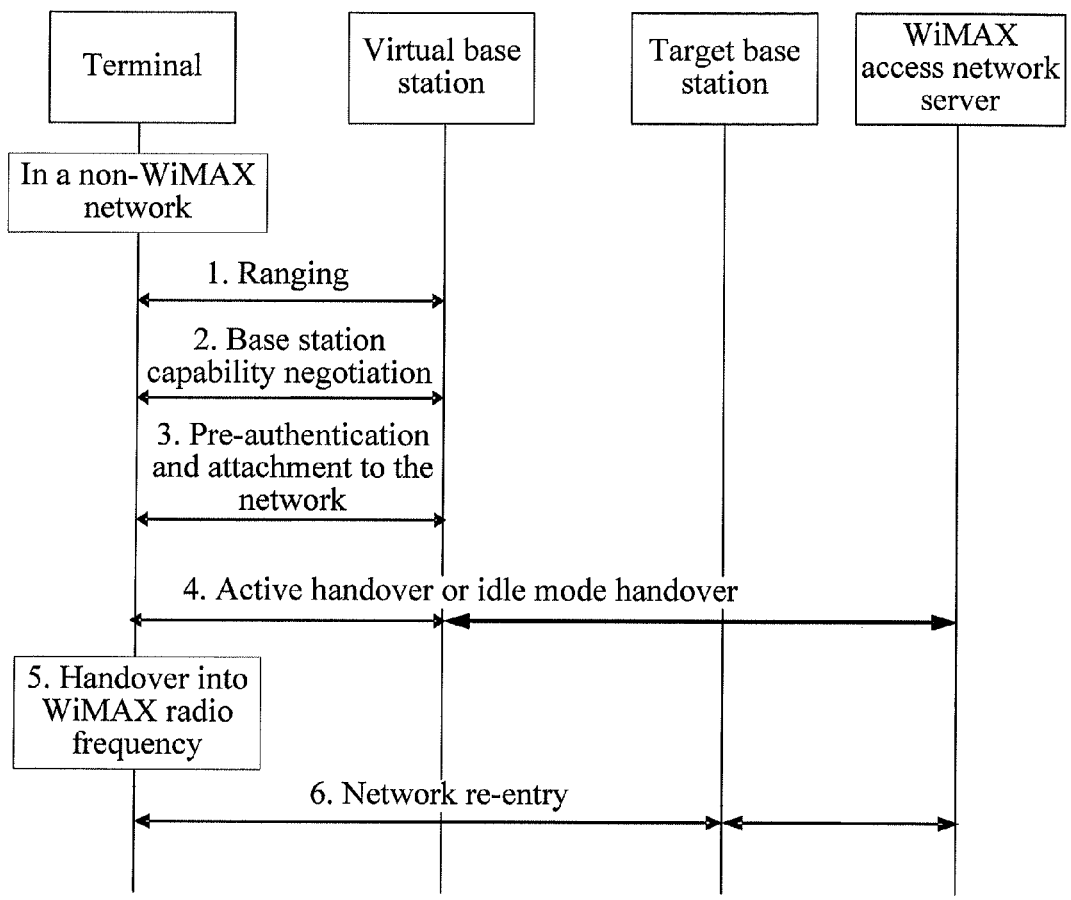
FIG. 1 is a flow chart of a handover method for a terminal being handed over from a non-WiMAX network to a WiMAX network in the conventional art.
Figure 2:
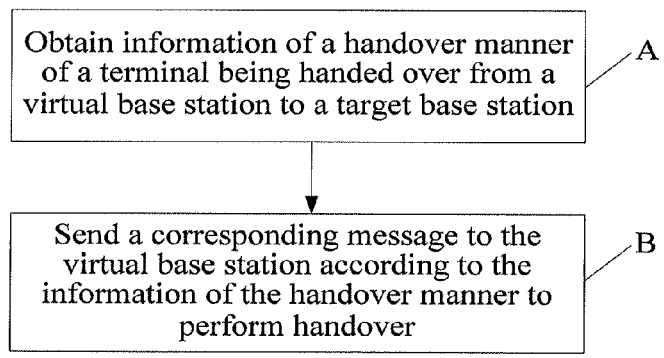
FIG. 2 is a flow chart of a method for network handover according to a method embodiment of the present invention.

A method for network handover, which is a method applicable to handover of a terminal from a non-WiMAX network to a WiMAX network, a flow chart of which is shown in FIG. 2. The method includes the following steps:

Step A: A terminal obtains information of a handover manner of the terminal being handed over from a virtual WiMAX base station (referred to as a virtual base station in short hereinafter) to a target base station, in which the handover manner is supported by the virtual base station.

Regarding obtaining the information of the handover manner of handover from the virtual base station to the target base station, the terminal may obtain the information by initiatively requesting the virtual base station, or receive the information which the virtual base station initiatively sends to the terminal, or may obtain the information from an information server storing capability information of the virtual base station.

The information of the handover manner includes: information indicating that the virtual base station supports initiate handover and/or information indicating that the virtual base station supports an idle mode. If the information of the handover manner includes the information indicating that the virtual base station supports the initiate handover, the terminal may be directly handed over from the virtual base station to the target base station through an initiative handover procedure. If the information of the handover manner includes the information indicating that the virtual base station supports the idle mode, the terminal may enter the idle mode through the virtual base station, and subsequently may exit the idle mode during network re-entry from the target base station, thereby implementing the handover from the virtual base station to the target base station.

It may be understood that, the information of the handover manner may be preset in the virtual base station, and may denote, through a manner word, a capability supported by the virtual base station. For example, 1 is used to denote that the initiate handover is supported, 2 is used to denote that the idle mode is supported, and 3 is used to denote that the both are supported. Respective flag bits of capabilities supported by the handover manners may also be separately used. When a value of a flag bit corresponding to a certain capability is 1, it denotes that such capability is supported. When a value of a flag bit corresponding to a certain capability is 0, it denotes that such capability is not supported. The information of the handover manner may also be on an information server storing capability information of the virtual base station.

Step B: The terminal sends a corresponding message to the virtual base station according to the information of the handover manner, so that the terminal is handed over from the virtual base station to the target base station in the corresponding handover manner.

It may be understood that, if the information of the handover manner obtained by the terminal includes the information indicating initiate handover, the terminal initiatively sends a handover request message to the virtual base station, requesting handover to the target base station, in which the handover request message further includes information of one or more target base stations discovered by the terminal. After receiving the handover request message, the virtual base station performs handover according to an initiate handover manner in the existing criterion, which is not repeated herein again.

If the information of the handover manner obtained by the terminal includes the information indicating idle mode handover, the terminal sends a request message for entering the idle mode to the virtual base station, requesting to enter the idle mode, and after the handover of the air interface, the terminal exits the idle mode from the target base station to be handed over to the target base station.

If the information of the handover manner obtained by the terminal includes the information indicating initiate handover and the information indicating idle mode handover, the terminal selects a handover manner, and sends a corresponding request message to the virtual base station. The handover manner may be randomly selected, or may be selected according to a policy preset by the terminal.

It can be seen that, the network handover manner adopted in the embodiment of the present invention is as follows. A terminal first obtains information of a handover manner of handover from a virtual base station to a target base station, and then sends a corresponding message to the virtual base station according to the information of the handover manner, so that the terminal is handed over from the virtual base station to the target base station. In this way, in a procedure that the terminal is handed over from a non-WiMAX network to a WiMAX network, the terminal may be directly handed over according to the handover manner supported by the virtual base station. Compared with the conventional art in which handover manners require handover attempts, the adoption of the method for network handover of the embodiment of the present invention reduces handover time and increases network handover efficiency.

Method Embodiment 1

Figure 3:
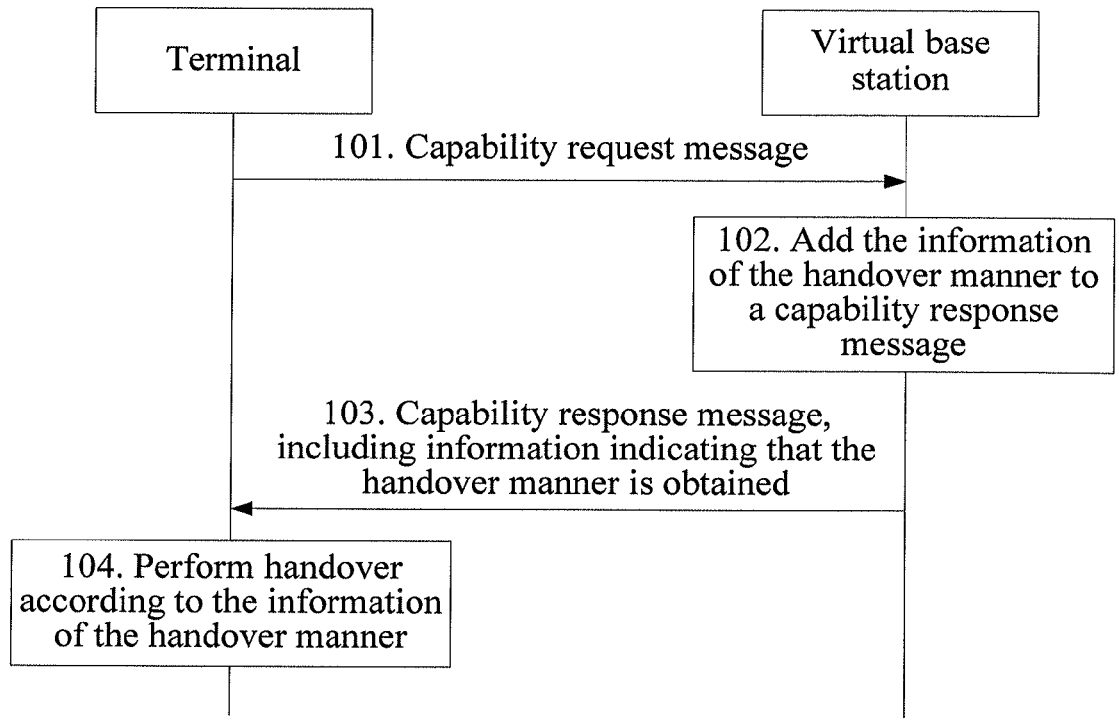
FIG. 3 is a flow chart of a method for network handover according to method embodiment 1 of the present invention.

A method for network handover, which is a method applicable to handover of a terminal from a non-WiMAX network to a WiMAX network, and in this embodiment, the information of a handover manner is obtained in a procedure of capability interaction between the terminal and a virtual base station, a flow chart of which is shown in FIG. 3. The method includes the following steps:

Step 101: A terminal accesses a WiMAX network through a virtual base station. The terminal needs to exchange capability information with the virtual base station after performing ranging with the virtual base station and before performing pre-authentication with the virtual base station, and the terminal sends a capability request message to the virtual base station.

It may be understood that, the capability request message may include capability information indicating that the handover manner of the terminal being handed over from the virtual base station to the target base station is obtained. The terminal may add the capability information indicating that the handover manner of the terminal being handed over from the virtual base station to the target base station is obtained to the capability request message, such as, to a message body or to a message header, and a new information element may also be added to the capability request message and add the indication information to the newly added information element. It may be understood that, the capability request message may further include indication information indicating that other capabilities of the virtual base station are obtained. The capability request message may include no indication information.

Step 102: After receiving the capability request message, the virtual base station adds the information of the handover manner of the terminal being handed over from the virtual base station to a target base station to a bearer message, that is, a capability response message.

After receiving the capability request message, the virtual base station may send a corresponding capability of the virtual base station to the terminal according to the indication information in the capability request message. If the capability request message includes no indication information, the virtual base station sends information of all capabilities of the virtual base station to the terminal. Particularly, for capability information of a handover manner, the virtual base station may first obtain the information of a handover manner supported by the virtual base station, for example, the information is obtained by querying preset property information; and add the obtained information of a handover manner supported by the virtual base station to a message body or message header of the capability response message, or a new information element may also be added to the capability response message, and the information of the handover manner supported by the virtual base station is added to the newly added information element.

Step 103: Send the bearer message, that is, the capability response message to the terminal, so that the terminal is handed over from the virtual base station to the target base station according to the information of the handover manner supported by the virtual base station.

Step 104: The terminal receives the capability response message, and sends a corresponding message to the virtual base station according to the information of the handover manner of the terminal being handed over from the virtual base station to the target base station included in the capability response message after the terminal completes a pre-authentication and network attachment registration procedure, so as to perform a step of handover of the terminal from the virtual base station to the target base station.

It can be seen that, in the method for network handover of this embodiment, in the procedure of entering the WiMAX network through the virtual base station, in the procedure that the terminal continues capability interaction with the virtual base station, the virtual base station returns the information of the handover manner of the terminal being handed over from the virtual base station to the target base station to the terminal through the bearer message, that is, the capability response message. In this way, the terminal may be directly handed over according to the handover manner supported by the virtual base station. Compared with the conventional art in which handover manners require handover attempts, the adoption of the method for network handover of the embodiment of the present invention reduces handover time and increases network handover efficiency.

Method Embodiment 2

Figure 4:
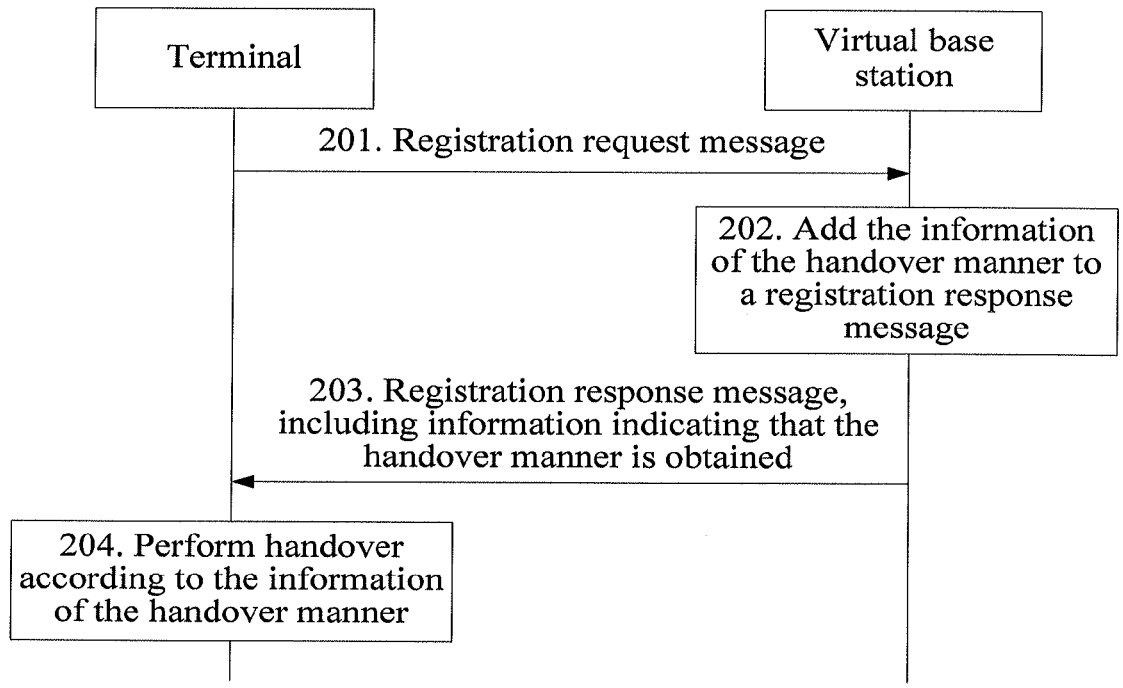
FIG. 4 is a flow chart of a method for network handover according to method embodiment 2 of the present invention.

A method for network handover, which is a method applicable to handover of a terminal from a non-WiMAX network to a WiMAX network, and in this embodiment, the information of a handover manner is sent to the terminal by a virtual base station through a registration response message, a flow chart of which is shown in FIG. 4. The method includes the following steps:

Step 201: A terminal accesses a WiMAX network through a virtual base station, and sends a registration request message to the virtual base station to attach to the WiMAX network after the terminal performs interaction procedures with the virtual base station, such as ranging and pre-authentication.

It may be understood that, the registration request message may include capability information indicating that the handover manner of the terminal being handed over from the virtual base station to the target base station is obtained. The terminal may add the capability information indicating that the handover manner of the terminal being handed over from the virtual base station to the target base station is obtained to the registration request message, such as, to a message body or message header, or a new information element may also be added to the registration request message, and add the indication information to the newly added information element.

Step 202: After receiving the registration request message, the virtual base station adds the information of the handover manner of the terminal being handed over from the virtual base station to a target base station to a bearer message, that is, a registration response message.

After receiving the registration request message, the virtual base station may send a corresponding capability of the virtual base station to the terminal according to the indication information in the capability request message. If the registration request message includes no indication information, the virtual base station sends information of all capabilities of the virtual base station to the terminal. Particularly, for capability information of a handover manner, the virtual base station may first obtain the information of a handover manner supported by the virtual base station, such as, obtain the information by querying preset property information; and add the obtained information of a handover manner supported by the virtual base station to a message body or message header of the registration response message, or may also add a new information element to the registration response message, and add the information of the handover manner supported by the virtual base station to the newly added information element.

Step 203: Send the bearer message, that is, the registration response message to the terminal, so that the terminal is handed over from the virtual base station to the target base station according to the information of the handover manner supported by the virtual base station.

Step 204: The terminal receives the registration response message, and sends a corresponding message to the virtual base station according to the information of the handover manner of the terminal being handed over from the virtual base station to the target base station included in the registration response message, so as to perform a step that the terminal is handed over from the virtual base station to the target base station.

It can be seen that, in the method for network handover of this embodiment, in the procedure of entering the WiMAX network through the virtual base station, the terminal sends the registration request message to the virtual base station, the virtual base station returns the information of the handover manner of the terminal being handed over from the virtual base station to the target base station to the terminal through the bearer message, that is, the registration response message. In this way, the terminal may be directly handed over according to the handover manner supported by the virtual base station. Compared with the conventional art in which handover manners require handover attempts, the adoption of the method for network handover of the embodiment of the present invention reduces handover time and increases network handover efficiency.

Method Embodiment 3

Figure 5:
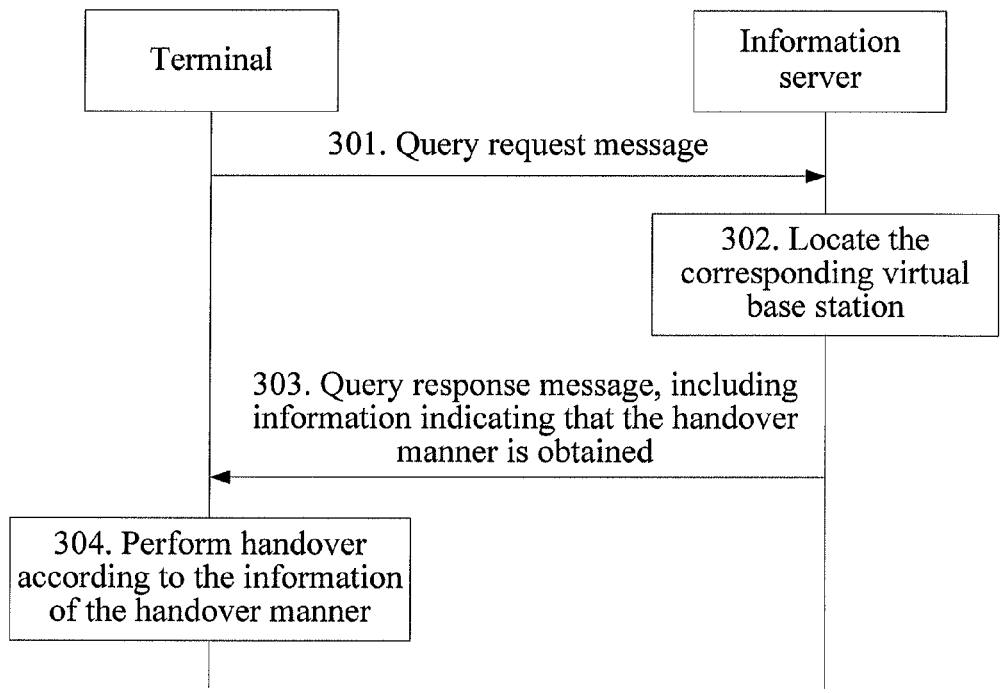
FIG. 5 is a flow chart of a method for network handover according to method embodiment 3 of the present invention.

A method for network handover, which is a method applicable to handover of a terminal from a non-WiMAX network to a WiMAX network, and in this embodiment, the information of a handover manner is obtained as follows: An information server storing capability property information of a virtual base station sends the information in a procedure of discovering the virtual base station and before the terminal enters the WiMAX network. A flow chart of the method is shown in FIG. 5. The method includes the following steps:

Step 301: A terminal sends a query request message to an information server, in which the query request message includes position information of the terminal and/or identifier information of the target base station, so that the information server locates, according to the position information, a base station available for the terminal and the virtual base station capable of interacting with the base station; or the information server locates, according to the identifier information of the target base station, the virtual base station capable of interacting with the target base station.

The information server may be a dynamic host configuration protocol (DHCP) server or an information server of an access network discovery and selection function (ANDSF) mechanism, or a seamless handover information server in the IEEE 802.21MIH specification. When the DHCP server is used, the query request message is a request or query message corresponding to the DHCP protocol. When the ANDSF information server is used, the query request message is a query request message of the ANDSF mechanism. When the 802.21MIH information server is used, the query request message may be an MIH query request message. A query response message sent by the information server is a response message corresponding to a protocol to which the query request message belongs, which is not repeated again.

Step 302: The information server receives the query request message, and locates a corresponding virtual base station according to the position information of the terminal and/or the identifier information of the target base station included in the query request message.

If the position information is included in the query request message the information server queries, through the position of the terminal, information of a base station available for the terminal and information of the virtual base station capable of interacting with the base station.

If the information of the target base station determined by the terminal is included in the query request message, the information server may query, through the identifier of the target base station, the information of the virtual base station capable of interacting with the target base station.

Step 303: The information server adds the information of the handover manner of the terminal being handed over from the located virtual base station to the target base station to a bearer message, that is, a query response message, and sends the bearer message to the terminal.

The information server may first obtain the information of a handover manner supported by the located virtual base station, such as, obtain the information by querying the property information preset by the virtual base station, and obtain the information from the capability property information of the virtual base station stored on the information server; and add the obtained information of a handover manner to a message body or message header of the query response message, or may also add a new information element to a registration response message, and add the information of the handover manner to the newly added information element.

It may be understood that, address information of the located virtual base station may be further added in the query response message. If the query request message sent by the terminal provides the terminal position information only, information such as the identifier information of a candidate target base station available for the located terminal may be further added in the query response message.

Step 304: The terminal receives the bearer message, that is, the query response message, and after entering the WiMAX network through the virtual base station, the terminal is handed over from the virtual base station to the target base station according to the information of the handover manner of the terminal being handed over from the located virtual base station to the target base station in the query response message.

It can be seen that, in the method for network handover of this embodiment, before the terminal enters the WiMAX network through the virtual base station, the terminal sends the query request message to the information server storing information such as a property capability of the virtual base station, and the information server returns the information of the handover manner of the terminal being handed over from the virtual base station to the target base station to the terminal through the bearer message, that is, the query response message. In this way, the terminal may be directly handed over according to a handover manner supported by the virtual base station. Compared with the conventional art in which handover manners require handover attempts, the adoption of the method for network handover of the embodiment of the present invention reduces handover time and increases network handover efficiency. Because the interaction of the information is performed before the terminal enters the WiMAX network, the network handover time is further reduced and the handover efficiency is further increased.

Device Embodiment 1

Figure 6:
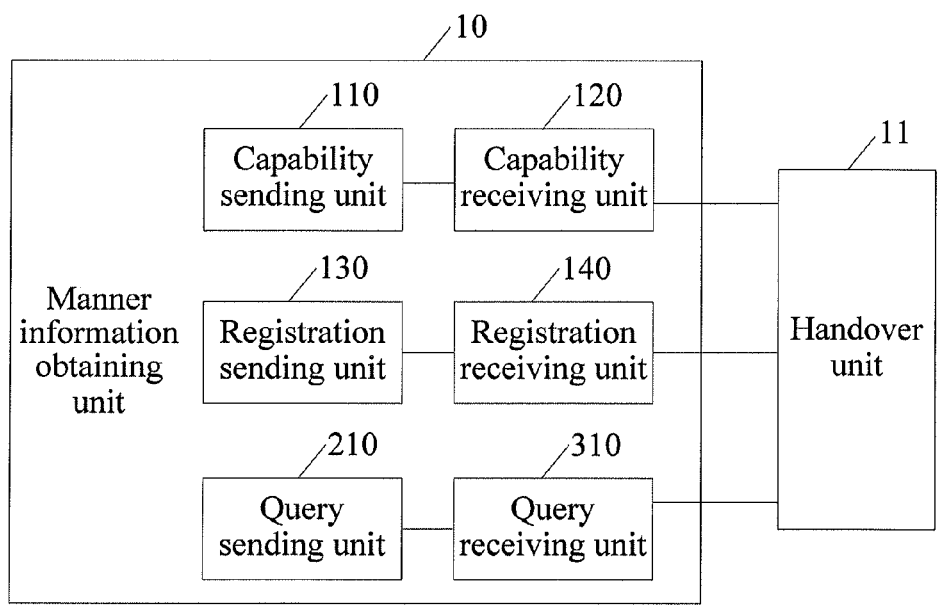
FIG. 6 is a schematic structural diagram of a terminal according to device embodiment 1 of the present invention.

A terminal, a schematic structural diagram of which is shown in FIG. 6, includes a manner information obtaining unit 10 and a handover unit 11.

The manner information obtaining unit 10 is configured to obtain information of a handover manner of a terminal being handed over from a virtual base station to a target base station, in which the handover manner is supported by the virtual base station, and the information of the handover manner includes information indicating initiate handover and/or information indicating idle mode handover.

When obtaining the information of the handover manner of handover from the virtual base station to the target base station, the manner information obtaining unit 10 may obtain the information by initiatively requesting the virtual base station, or the information is initiatively sent to the terminal by the virtual base station, or may be obtained from an information server storing capability information of the virtual base station. The information of the handover manner includes: information indicating that the virtual base station supports the initiate handover and/or information indicating that the virtual base station supports the idle mode, and the information of the handover manner may be preset in the virtual base station, or may be also on the information server storing the capability information of the virtual base station.

The handover unit 11 is configured to send a corresponding message to the virtual base station according to the information of the handover manner obtained by the manner information obtaining unit 10, so that the terminal is handed over from the virtual base station to the target base station in the corresponding handover manner.

It may be understood that, if the information of the handover manner obtained by the manner information obtaining unit 10 includes the information indicating initiate handover, the manner information obtaining unit 10 initiatively sends the handover request message to the virtual base station, requesting to be handed over to the target base station. If the information of the handover manner obtained by the manner information obtaining unit 10 includes the information indicating idle mode handover, the manner information obtaining unit 10 sends a request message for entering the idle mode to the virtual base station, requesting to enter the idle mode, and after the air interface handover of the terminal, the terminal exits the idle mode from the target base station, and is handed over to the target base station. If the information of the handover manner obtained by the manner information obtaining unit 10 includes the information indicating initiate handover and the information indicating idle mode handover, the handover unit 11 selects a handover manner, and sends a corresponding request message to the virtual base station.

It may be understood that, in a specific embodiment, the manner information obtaining unit 10 may include a capability sending unit 110 and a capability receiving unit 120.

The capability sending unit 110 is configured to send a capability request message to the virtual base station.

It may be understood that, the capability request message may include capability information indicating that the handover manner of the terminal being handed over from the virtual base station to the target base station is obtained. The capability sending unit 110 may add the capability information indicating that the handover manner of the terminal being handed over from the virtual base station to the target base station is obtained to the capability request message, such as, a message body or message header, or may also add a new information element to the capability request message, and add the indication information to the newly added information element. It may be understood that, the capability request message may further include indication information indicating that other capabilities of the virtual base station are obtained. The capability request message may include no indication information.

The capability receiving unit 120 is configured to receive a capability response message, wherein the capability response message is returned by the virtual base station in response to the capability request message sent by the capability sending unit 110, in which the capability response message includes the information of the handover manner of the terminal being handed over from the virtual base station to the target base station.

In another specific embodiment, the manner information obtaining unit 10 includes a registration sending unit 130 and a registration receiving unit 140.

The registration sending unit 130 is configured to send a registration request message to the virtual base station.

It may be understood that, the registration request message may include capability information indicating that the handover manner of the terminal being handed over from the virtual base station to the target base station is obtained. The registration sending unit 130 may add the capability information indicating that the handover manner of the terminal being handed over from the virtual base station to the target base station is obtained to the registration request message, such as, a message body or message header, or may also add a new information element to the registration request message, and add the indication information to the newly added information element.

The registration receiving unit 140 is configured to receive a registration response message, wherein the registration response message is returned by the virtual base station in response to the registration request message sent by the registration sending unit 130, in which the registration response message includes the information of the handover manner of the terminal being handed over from the virtual base station to the target base station.

In still another specific embodiment, the manner information obtaining unit 10 includes a query sending unit 210 and a query receiving unit 310.

The query sending unit 210 is configured to send a query request message to an information server, in which the query request message includes position information of the terminal and/or identifier information of the target base station, so that the information server locates, according to the position information, a base station available for the terminal and the virtual base station capable of interacting with the base station; or the information server locates, according to the identifier information of the target base station, the virtual base station capable of interacting with the target base station.

The query receiving unit 310 is configured to receive a query response message, wherein the query response message is returned by the information server in response to the query request message sent by the query sending unit 210, in which the query response message includes the information of the handover manner of the terminal being handed over from the virtual base station to the target base station.

The manner information obtaining unit 10 in the terminal of the embodiment of the present invention first obtains information of a handover manner of handover from a virtual base station to a target base station, and then the handover unit 11 sends a corresponding message to the virtual base station according to the information of the handover manner, so that the terminal is handed over from the virtual base station to the target base station. In this way, in a procedure that the terminal is handed over from a non-WiMAX network to a WiMAX network, the terminal may be directly handed over according to the handover manner supported by the virtual base station. Compared with the conventional art in which handover manners require handover attempts for the terminal, the adoption of the method for network handover of the terminal of the embodiment of the present invention reduces handover time and increases network handover efficiency.

Device Embodiment 2

Figure 7:
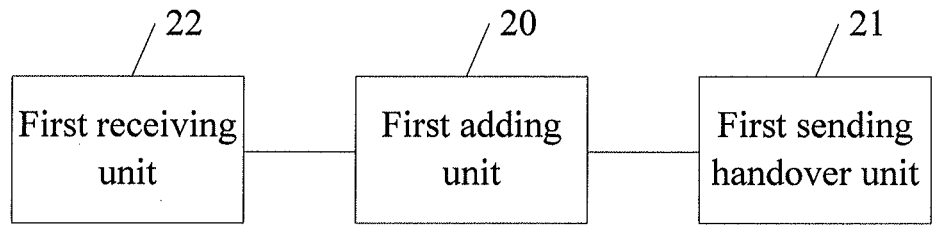
FIG. 7 is a schematic structural diagram of a virtual base station according to device embodiment 2 of the present invention.

A virtual base station, a schematic structural diagram of which is shown in FIG. 7, includes:

a first adding unit 20, configured to add information of a handover manner of a terminal being handed over from the virtual base station to a target base station to a bearer message, in which the handover manner is supported by the virtual base station; and a first sending handover unit 21, configured to send the bearer message to which the first adding unit has added the information of the handover manner 20 to the terminal, so that the terminal is handed over from the virtual base station to the target base station according to the information of the handover manner supported by the virtual base station.

It may be understood that, the virtual base station may further include:

a first receiving unit 22, configured to receive a capability request message or receive a registration request message of the terminal.

The bearer message herein may be a message such as a capability response message or registration response message. If the first receiving unit 22 receives the capability request message or registration request message, the first sending handover unit 21 may send a corresponding capability of the virtual base station to the terminal through the bearer message according to indication information in the capability request message or registration request message. If the capability request message or registration request message includes no indication information, the first sending handover unit 21 sends information of all capabilities of the virtual base station to the terminal through the bearer message. Particularly, for capability information of a handover manner, the first adding unit 20 may first obtain the information of a handover manner supported by the first adding unit 20, for example, obtain the information by querying the preset property information. In a case that the first receiving processing unit 22 receives the capability request information, the first receiving processing unit 22 adds the obtained information of the handover manner supported by the first adding unit 20 to the capability response message. In a case that the first receiving processing unit receives the registration request information, the first receiving processing unit adds the obtained information of the handover manner supported by the first adding unit 20 to the registration response message, for example, adds the obtained information to a message body or message header of the capability response message or registration response message, or also adds a new information element to the capability response message or registration response message, and adds the information of the handover manner supported by the first adding unit 20 to the newly added information element.

It can be seen that, in the virtual base station of this embodiment, the first receiving unit 22 receives the capability request message or registration request message sent by the terminal, and the second sending handover unit 21 returns the information of the handover manner of the terminal being handed over from the virtual base station to the target base station to the terminal through the bearer message, that is, the capability response message or the registration response message. In this way, the terminal may be directly handed over according to the handover manner supported by the virtual base station, thereby reducing handover time and increasing network handover efficiency.

Device Embodiment 3

Figure 8:
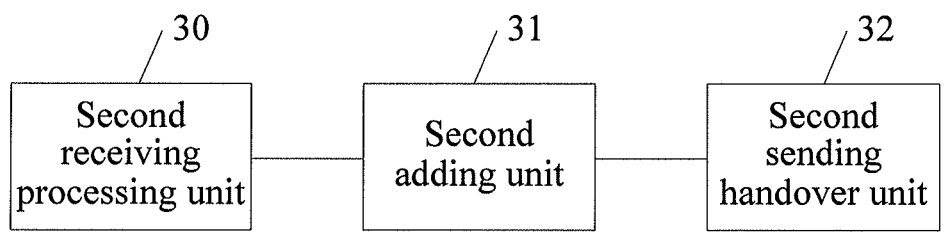
FIG. 8 is a schematic structural diagram of an information server according to device embodiment 3 of the present invention.

An information server, a schematic structural diagram of which is shown in FIG. 8, includes a second receiving processing unit 30, a second adding unit 31 and a second sending handover unit 32.

The second receiving processing unit 30 is configured to receive a query request message sent by a terminal, in which the query request message includes position information of the terminal and/or identifier information of a target base station; and locate a corresponding virtual base station according to the position information of the terminal and/or the identifier information of the target base station included in the query request message.

If the query request message includes the position information, the second receiving processing unit 30 queries, through the position of the terminal, information of a base station available for the terminal and information of the virtual base station capable of interacting with the base station.

If the query request message includes the information of the target base station determined by the terminal, the second receiving processing unit 30 may query, through the identifier of the target base station, the information of the virtual base station capable of interacting with the target base station.

The second adding unit 31 is configured to add information of a handover manner of the terminal being handed over from the virtual base station to a target base station to a query response message, in which the handover manner is supported by the virtual base station located by the second receiving processing unit 30.

The second adding unit 31 may first obtain the information of a handover manner supported by the located virtual base station, such as, obtain the information by querying the property information preset by the virtual base station, and obtain the information from the capability property information of the virtual base station stored in the information server; and add the obtained information of the handover manner to a message body or message header of the query response message, or also add a new information element to a registration response message, and add the information of the handover manner to the newly added information element.

It may be understood that, address information of the located virtual base station may be further added in the query response message. If the query request message sent by the terminal provides the terminal position information only, information such as the identifier information of a candidate target base station available for the located terminal may be further added in the query response message.

The second sending handover unit 32 is configured to send the query response message to which the second adding unit 31 has added the information of the handover manner to the terminal, so that the terminal is handed over from the virtual base station to the target base station according to the information of the handover manner supported by the virtual base station.

In the information server of this embodiment, the second receiving processing unit 30 receives the query request message sent by the terminal, the second sending handover unit 32 returns the information of the handover manner of the terminal being handed over from the virtual base station to the target base station to the terminal through the bearer message, that is, the query response message. In this way, the terminal may be directly handed over according to the handover manner supported by the virtual base station, thereby reducing handover time and increasing network handover efficiency. Because the interaction of the information is performed before the terminal enters the WiMAX network, network handover time is further reduced and the handover efficiency is further increased.

System Embodiment

Figure 9:
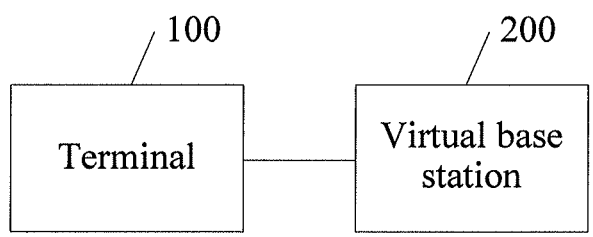
FIG. 9 is a schematic structural diagram of a system for network handover according to a system embodiment of the present invention.

A system for network handover, a schematic structural diagram of which is shown in FIG. 9, includes: a terminal 100 and a virtual base station 200.

The virtual base station 200 is configured to add information of a handover manner of the terminal being handed over from the virtual base station to a target base station to a bearer message, in which the handover manner is supported by the virtual base station; and send the bearer message to the terminal 100.

The terminal 100 is configured to receive the bearer message sent by the virtual base station 200, and obtain the information of the handover manner of the terminal being handed over from the virtual base station to the target base station, in which the handover manner is supported by the virtual base station and the information of the handover manner includes information indicating initiate handover and/or information indicating idle mode handover; and send a corresponding message to the virtual base station according to the information of the handover manner, so that the terminal is handed over from the virtual base station to the target base station.

It can be seen that, the network handover manner adopted in the embodiment of the present invention is as follows: a terminal first obtains information of a handover manner of handover from a virtual base station to a target base station, and then sends a corresponding message to the virtual base station according to the information of the handover manner, so as to perform network handover. In this way, in a procedure that the terminal is handed over from a non-WiMAX network to a WiMAX network, the terminal may be directly handed over according to the handover manner supported by the virtual base station. Compared with the conventional art in which handover manners require handover attempts, the adoption of the method for network handover of the embodiment of the present invention reduces handover time and increases network handover efficiency.

Persons of ordinary skill in the art should understand that all or a part of the processes of the method according to the embodiments of the present invention may be implemented by a program instructing relevant hardware. The program may be stored in a computer readable storage medium. When the program is run, the processes of the method according to the embodiments of the present invention are performed. The storage medium may be a magnetic disk, an optical disk, a read-only memory (Read-Only Memory, ROM) or a random access memory (Random Access Memory, RAM).

The foregoing descriptions are merely several embodiments of the present invention, but not intended to limit the present invention. Various variations and modifications made by persons skilled in the art without departing from the spirit of the present invention fall within the scope of the present invention. Therefore, the protection scope of the present invention shall be the protection scope of the claims.

What is claimed is:

1. A method for non-WiMAX (Worldwide Interoperability for Microwave Access) network to WiMAX network handover, comprising:
   obtaining by a terminal from an information server, information of a non-WiMAX network to WiMAX network handover manner of the terminal being handed over from a virtual WiMAX base station to a target base station, wherein the information of the non-WiMAX network to WiMAX network handover manner is supported by the virtual WiMAX base station, and the information of the non-WiMAX network to WiMAX network handover manner comprises at least one of information indicating initiate handover and information indicating idle mode handover; and
   sending by the terminal, a corresponding message to the virtual WiMAX base station according to the information of the non-WiMAX network to WiMAX network handover manner, so that the terminal is handed over from the virtual WiMAX base station to the target base station according to the information of the non-WiMAX network to WiMAX network handover manner; and
   wherein the obtaining the information of the non-WiMAX network to WiMAX network handover manner of the terminal being handed over from the virtual WiMAX base station to the target base station comprises:
      sending a query request message to the information server, wherein the query request message comprises at least one of position information of the terminal and identifier information of the target base station, so that the information server locates, according to the position information, a base station available for the terminal and the virtual WiMAX base station capable of interacting with the base station; or the information server locates, according to the identifier information of the target base station, the virtual WiMAX base station capable of interacting with the target base station; and
      receiving a query response message, wherein the query response message is returned by the information server in response to the query request message, wherein the query response message comprises the information of the non-WiMAX network to WiMAX network handover manner of the terminal being handed over from the virtual WiMAX base station to the target base station.

2. The method according to claim 1, wherein the obtaining the information of the non-WiMAX network to WiMAX network handover manner of the terminal being handed over from the virtual WiMAX base station to the target base station comprises:
   sending by the terminal, a capability request message to the virtual WiMAX base station; and
   receiving from the virtual base station, a capability response message, wherein the capability response message is returned by the virtual WiMAX base station in response to the capability request message, wherein the capability response message comprises the information of the non-WiMAX network to WiMAX network handover manner of the terminal being handed over from the virtual WiMAX base station to the target base station.

3. The method according to claim 1, wherein the obtaining the information of the non-WiMAX network to WiMAX network handover manner of the terminal being handed over from the virtual base station to the target base station comprises:
   sending a registration request message to the virtual WiMAX base station; and
   receiving a registration response message, wherein the registration response message is returned by the virtual WiMAX base station in response to the registration request message, wherein the registration response message comprises the information of the non-WiMAX network to WiMAX network handover manner of the terminal being handed over from the virtual WiMAX base station to the target base station.

4. The method according to claim 1, wherein the sending the corresponding message to the virtual WiMAX base station according to the information of the non-WiMAX network to WiMAX network handover manner comprises:
   if the information of the non-WiMAX network to WiMAX network handover manner comprises the information indicating the initiate handover, sending the handover request message to the virtual WiMAX base station; or
   if the information of the non-WiMAX network to WiMAX network handover manner comprises the information indicating the idle mode handover, sending a request message for entering an idle mode to the virtual WiMAX base station; or
   if the information of the non-WiMAX network to WiMAX network handover manner comprises the information indicating the initiate handover and the information indicating the idle mode handover, selecting a handover manner, and sending a corresponding request message to the virtual WiMAX base station.

5. A method for network handover, comprising:
   adding by a virtual WiMAX base station, information of a non-WiMAX network to WiMAX network handover manner of a terminal being handed over from a virtual WiMAX base station to a target base station to a bearer message, wherein the information of the handover manner is supported by the virtual WiMAX base station, and
   sending by the virtual WiMAX base station, the bearer message to the terminal, so that the terminal is handed over from the virtual WiMAX base station to the target base station according to the information of the non-WiMAX network to WiMAX network handover manner supported by the virtual WiMAX base station; and
   wherein before the adding the information of the non-WiMAX network to WiMAX network handover manner of the terminal being handed over from the virtual WiMAX base station to the target base station to the bearer message, the method further comprises:
      receiving a query request message sent by the terminal, wherein the query request message comprises at least one of position information of the terminal and identifier information of the target base station;
      locating the corresponding virtual WiMAX base station according to the at least one of the position information of the terminal and identifier information of the target base station comprised in the query request message, wherein the adding the information of the non-WiMAX network to WiMAX network handover manner of the terminal being handed over from the virtual WiMAX base station to the target base station to the bearer message is: adding the information of the non-WiMAX network to WiMAX network handover manner of the terminal being handed over from the located virtual WiMAX base station to the target base station to the bearer message, that is, a query response message.

6. The method according to claim 5, wherein before the adding the information of the non-WiMAX network to WiMAX network handover manner of the terminal being handed over from the virtual WiMAX base station to the target base station to the bearer message, the method further comprises:

receiving a capability request message, wherein the adding the information of the non-WiMAX network to WiMAX network handover manner of the terminal being handed over from the virtual WiMAX base station to the target base station to the bearer message is: adding the information of the non-WiMAX network to WiMAX network handover manner of the terminal being handed over from the virtual WiMAX base station to the target base station to a capability response message; or receiving a registration request message of the terminal, wherein the adding the information of the non-WiMAX network to WiMAX network handover manner of the terminal being handed over from the virtual WiMAX base station to the target base station to the bearer message is: adding the information of the non-WiMAX network to WiMAX network handover manner of the terminal being handed over from the virtual WiMAX base station to the target base station to a registration response message.

7. A terminal, comprising:

a manner information obtaining unit, configured to obtain from an information server, information of a non-WiMAX network to WiMAX network handover manner of a terminal being handed over from a virtual WiMAX base station to a target base station, wherein the information of the non-WiMAX network to WiMAX network handover manner is supported by the virtual WiMAX base station, and the information of the non-WiMAX network to WiMAX network handover manner comprises at least one of information indicating initiate handover and information indicating idle mode handover; and a handover unit, configured to send a corresponding message to the virtual WiMAX base station according to the information of the non-WiMAX network to WiMAX network handover manner obtained by the manner information obtaining unit, so that the terminal is handed over from the virtual WiMAX base station to the target base station according to the information of the non-WiMAX network to WiMAX network handover manner; and wherein the manner information obtaining unit comprises:

a query sending unit, configured to send a query request message to the information server, wherein the query request message comprises position information of the terminal and/or identifier information of the target base station, so that the information server locates, according to the position information, a base station available for the terminal and the virtual WiMAX base station capable of interacting with the base station; or the information server locates, according to the identifier information of the target base station, the virtual WiMAX base station capable of interacting with the target base station; and a query receiving unit, configured to receive a query response message, wherein the query response message is returned by the information server in response to the query request message sent by the query sending unit, wherein the query response message comprises the information of the non-WiMAX network to WiMAX network handover manner of the terminal being handed over from the virtual WiMAX base station to the target base station.

8. The terminal according to claim 7, wherein the manner information obtaining unit comprises:

a capability sending unit, configured to send a capability request message to the virtual WiMAX base station; and a capability receiving unit, configured to receive a capability response message, wherein the capability response message is returned by the virtual WiMAX base station in response to the capability request message sent by the capability sending unit, wherein the capability response message comprises the information of the non-WiMAX network to WiMAX network handover manner of the terminal being handed over from the virtual WiMAX base station to the target base station.

9. The terminal according to claim 7, wherein the manner information obtaining unit comprises:

a registration sending unit, configured to send a registration request message to the virtual WiMAX base station; and a registration receiving unit, configured to receive a registration response message, wherein the registration response message is returned by the virtual WiMAX base station in response to the registration request message sent by the registration sending unit, wherein the registration response message comprises the information of the non-WiMAX network to WiMAX network handover manner of the terminal being handed over from the virtual WiMAX base station to the target base station.

10. A virtual WiMAX base station, comprising:

a first adding unit, configured to add information of a handover manner of a terminal being handed over from the virtual base station to a target base station to a bearer message, wherein the information of the handover manner is supported by the virtual WiMAX base station, a first sending handover unit, configured to send the bearer message to which the first adding unit has added the information of the non-WiMAX network to WiMAX network handover manner to the terminal, so that the terminal is handed over from the virtual WiMAX base station to the target base station according to the information of the non-WiMAX network to WiMAX network handover manner supported by the virtual WiMAX base station; and a first receiving processing unit, configured to receive a capability request message or receive registration request information of the terminal; wherein the first adding unit is configured to add the information of the non-WiMAX network to WiMAX network handover manner of the terminal being handed over from the virtual WiMAX base station to the target base station to a capability response message in a case that the first receiving processing unit receives the capability request information; or add the information of the non-WiMAX network to WiMAX network handover manner of the terminal being handed over from the virtual WiMAX base station to the target base station to a registration response message in case that the first receiving processing unit receives the registration request information.

11. An information server, comprising:
a second receiving processing unit, configured to receive a query request message sent by a terminal, wherein the query request message comprises at least one of position information of the terminal and identifier information of a target base station; and locate a corresponding virtual WiMAX base station according to the at least one of position information of the terminal and identifier information of the target base station comprised in the query request message;
a second adding unit, configured to add information of a non-WiMAX network to WiMAX network handover manner of the terminal being handed over from the virtual WiMAX base station to a target base station to a query response message, wherein the information of the non-WiMAX network to WiMAX network handover manner is supported by the virtual WiMAX base station located by the second receiving processing unit; and
a second sending handover unit, configured to send the query response message to which the second adding unit has added the information of the non-WiMAX network to WiMAX network handover manner to the terminal, so that the terminal is handed over from the virtual WiMAX base station to the target base station according to the information of the non-WiMAX network to WiMAX network handover manner supported by the virtual WiMAX base station.

12. A system for network handover, comprising: a terminal and a virtual WiMAX base station, wherein
the virtual WiMAX base station is configured to add information of a non-WiMAX network to WiMAX network handover manner of the terminal being handed over from the virtual WiMAX base station to a target base station to a bearer message, wherein the information of the non-WiMAX network to WiMAX network handover manner is supported by the virtual WiMAX base station; and the virtual WiMAX base station send the bearer message to the terminal; and
the terminal is configured to receive the bearer message sent by the virtual WiMAX base station, and obtain the information of the non-WiMAX network to WiMAX network handover manner of the terminal being handed over from the virtual WiMAX base station to the target base station, wherein the information of the non-WiMAX network to WiMAX network handover manner comprises one of: information indicating initiate handover and information indicating idle mode handover; and send a corresponding message to the virtual WiMAX base station according to the information of the non-WiMAX network to WiMAX network handover manner, so that the terminal is handed over from the virtual WiMAX base station to the target base station.

* * * * *